US006182199B1

United States Patent
Faust

(10) Patent No.: US 6,182,199 B1
(45) Date of Patent: Jan. 30, 2001

(54) SYSTEM AND METHOD FOR GRANTING PERMISSION TO MODIFY A MEMORY AREA

(75) Inventor: Robert Allan Faust, Austin, TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/146,659

(22) Filed: Sep. 3, 1998

(51) Int. Cl.[7] ....................................................... G06F 12/14
(52) U.S. Cl. ........................... 711/163; 711/152; 711/166; 713/200
(58) Field of Search ................................. 711/152, 163, 711/166, 219; 713/200

(56) References Cited

U.S. PATENT DOCUMENTS

| | | | |
|---|---|---|---|
| 5,592,641 | * | 1/1997 | Fandrich et al. ...................... 711/103 |
| 5,721,872 | * | 2/1998 | Kasuta ................................. 711/163 |

* cited by examiner

Primary Examiner—Hiep T. Nguyen

(74) Attorney, Agent, or Firm—Leslie A. Van Leeuwen

(57) ABSTRACT

A system, method, and computer readable medium allow for granting permission to modify a memory area, such as a data variable stored in memory, without using valuable memory space to store permission variables. Rather than using separate permission variables, a portion of a data variable is used to indicate whether or not the data variable may be modified. The least significant bit of a variable (i.e. memory area) is used as a permission indicator. When the least significant bit is set to one, it is permissible to modify the variable. When the least significant bit is set to zero, it is not permissible to modify the variable. In one embodiment of the present invention, a counter variable is both checked for permission to increment, and incremented (if permission is granted) in one step. Efficiency is increased, which is especially valuable in the case of embedded systems, where memory space is typically in short supply. Because valuable memory space is conserved, more data may be stored in memory, and thus more data functions may be implemented in the embedded system. Further, because permission to modify a data variable is contained within the data variable itself, a program which desires to modify the data variable does not need to reference a permission, or locking, variable and test for permission to modify the data variable.

12 Claims, 3 Drawing Sheets

SYSTEM AND METHOD FOR GRANTING PERMISSION TO MODIFY A MEMORY AREA

FIELD OF THE INVENTION

The present invention relates to information handling systems, and, more particularly, to a system and method for granting permission to modify a memory area.

BACKGROUND OF THE INVENTION

A microcontroller is usually contained on a single integrated circuit, and is often intended to operate as an embedded system. In addition to a processing unit (e.g., a CPU), a microcontroller typically contains a small amount of random access memory (RAM), programmable read only memory (PROM), timers, and I/O ports. RAM is often in very short supply in embedded microcontroller applications. Often, it is limited to amounts in the 32 to 256 byte range.

Microcontrollers are often used to perform complex tasks in an information handling system. For example, a microcontroller may be used as a service processor for environmental monitoring within the system, early power off warning, error log analysis, etc. Microcontrollers are also used for data acquisition and control of subsystems, motion devices, input devices, display devices, instrumentation devices, etc.

Many software programs, including those written as embedded microcontroller applications, require that some type of permission or authority be acquired, before a memory location is modified. Usually, some type of permission variable is used to indicate that another variable, such as a data variable, may be updated. For example, before updating a counter, the application program checks a permission indicator variable. If the permission indicator variable is set to a certain value, the counter may be modified. If, however, the permission indicator variable is set to another value, the counter may not be modified.

Permission indicator variables can use a great deal of RAM. RAM is consumed for every memory area (e.g., the counters described above), and for each permission variable associated with the memory areas. In a typical processor, this is usually not a problem. However, in a microcontroller, where RAM is typically in short supply, this can be an overwhelming problem. Conserving even a small amount of RAM can make a major difference in the functionality of an embedded microcontroller application.

Consequently, it would be desirable to have a system and method for conserving RAM in an embedded microcontroller application. It would be desirable to have a permission, or locking, system for memory areas (i.e. variables) that does not consume valuable RAM space.

SUMMARY OF THE INVENTION

Accordingly, the present invention is directed to a system, method, and computer readable medium for granting permission to modify a memory area, such as a data variable stored in memory, without using valuable memory space to store permission variables. Rather than using separate permission variables, a portion of a data variable is used to indicate whether or riot the data variable may be modified.

The least significant bit of a variable (i.e. memory area) is used as a permission indicator. When the least significant bit is set to one, it is permissible to modify the variable. When the least significant bit is set to zero, it is not permissible to modify the variable. In one embodiment of the present invention, a counter variable is both checked for permission to increment, and incremented (if permission is; granted) in one step.

One advantage of the present invention is that it increases the efficiency of embedded systems, where memory space is typically in short supply. Because valuable memory space is conserved, more data may be stored in memory, and thus more data functions may be implemented in the embedded system. Further, because permission to modify a data variable is contained within the data variable itself, a program which desires to modify the data variable does not need to reference a permission, or locking, variable and test for permission to modify the data variable.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which.

DETAILED DESCRIPTION OF A PREFERRED EMBODIMENT OF THE INVENTION

Figure 1:
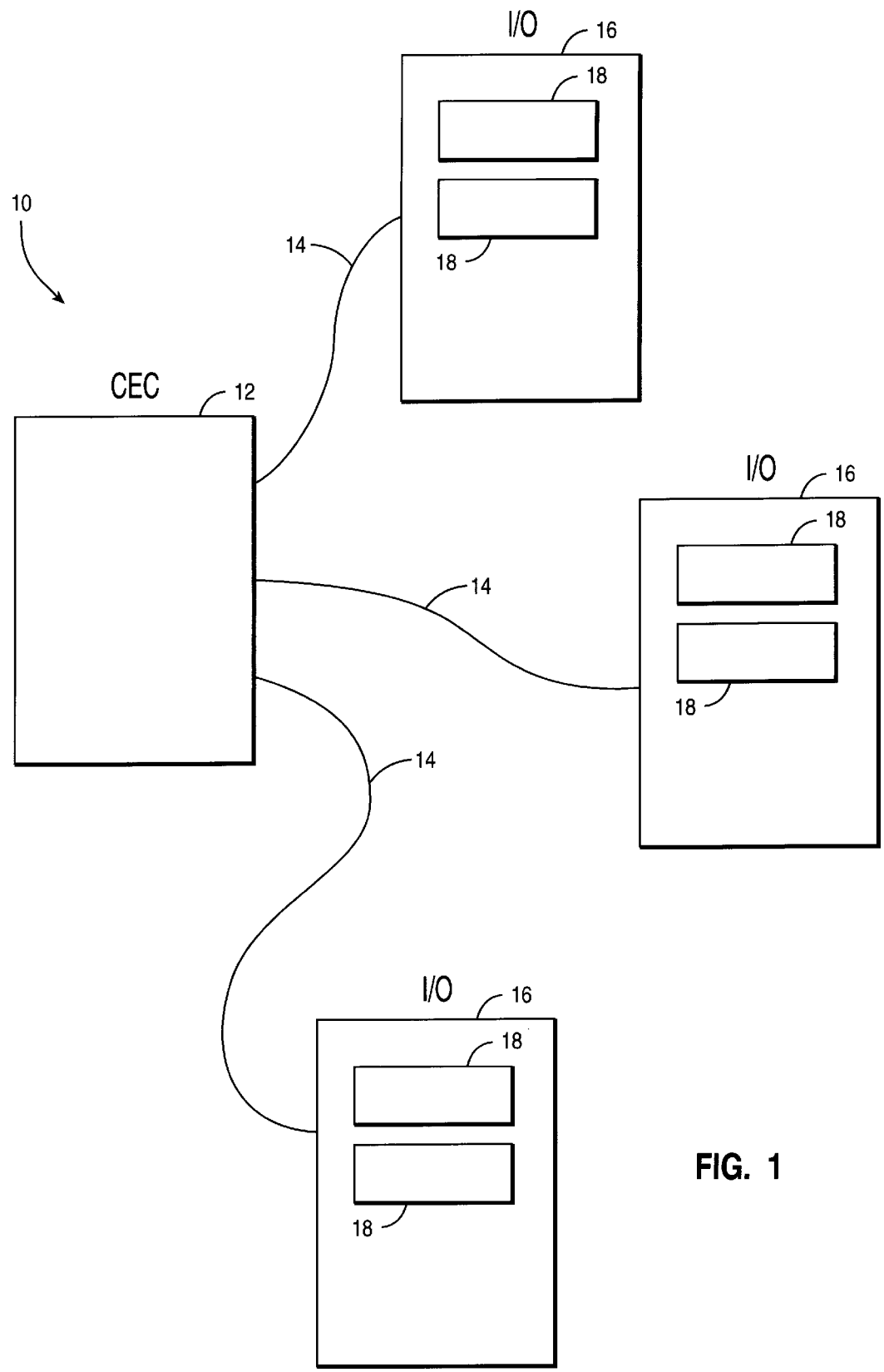
FIG. 1 is a block diagram of an information handling system in which the present invention may be implemented.

The invention may be implemented on a variety of hardware platforms, including personal computers, workstations, mini-computers, servers, and mainframe computers. Referring now to FIG. 1, a typical configuration of an information handling system that may be used to practice the novel method of the present invention will be described. The information handling system depicted in FIG. 1 is a high end server 10 that includes several physical enclosures. A physical enclosure, referred to as the central electronics complex (CEC) 12, contains processor cards, a memory controller, memory cards, power supplies, and cooling units (not shown). CEC 10 is connected, via cables 14, to one or more input/output (I/O) racks 16. Each I/O rack 16 may contain several I/O drawers 18. Each I/O drawer 18 may contain many ports, slots, and bays (not shown) for attaching various I/O devices, such as direct access storage devices (DASD), disk drives, PCI devices, etc.

Other information handling systems, e.g., smaller and mid-range servers, or single-user systems, are contained within one physical enclosure. An entire system, including processor cards, a memory controller, memory cards, power supplies, cooling units, and I/O devices (including I/O ports and slots to attach additional I/O devices) may be contained within a single system drawer or system unit.

A service processor is often included within an I/O drawer, a system drawer, or a system unit. A service processor is often implemented on a microcontroller device. Service processors are used to perform tasks such as system environmental monitoring/alerting (e.g., AC/DC voltage, fan speed and temperature sensing), early power-off warnings, and error log analysis and alerts. Some service processors automatically dial a service center, without operator initiation, when a potential component failure is detected.

Figure 2:
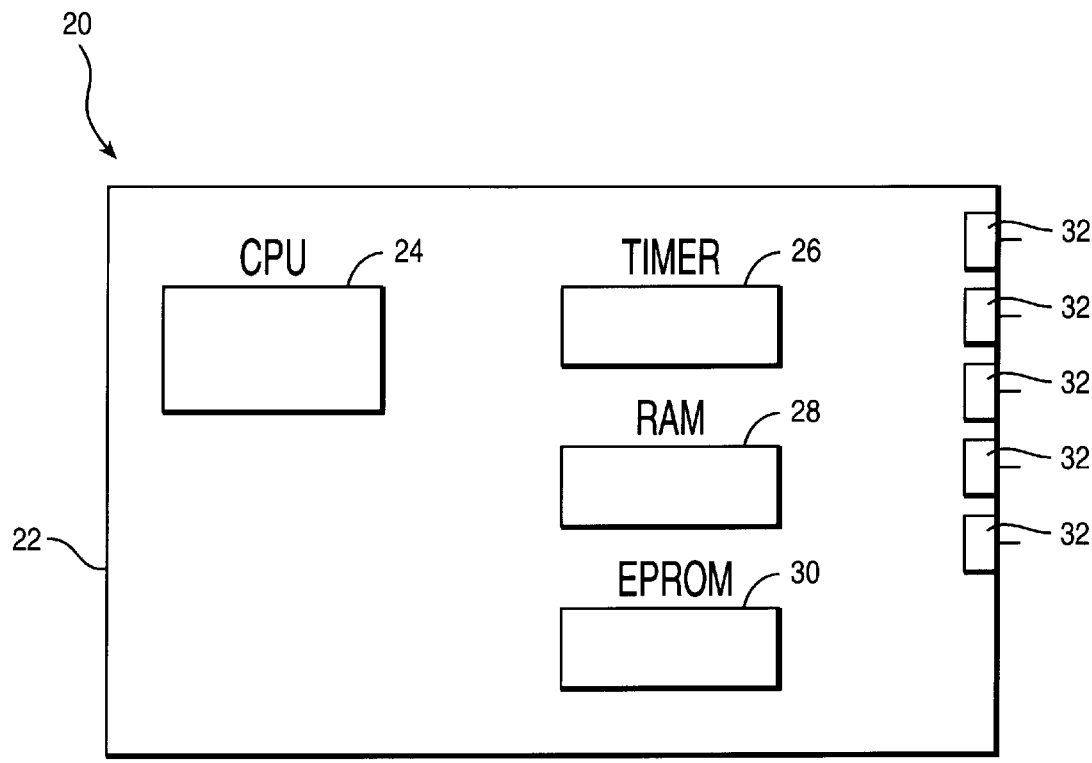
FIG. 2 is a block diagram of a typical microcontroller in which the present invention may be implemented.

FIG. 2 is a block diagram of an exemplary service processor 20, implemented on a microcontroller 22, in which the present invention may be implemented. Note that while the invention is described with reference to a service processor implemented on a microcontroller, this is not meant to be limiting. The present invention may be implemented in many types of information handling systems, including, but not limited to personal computers, workstations, mini-computers, servers, and mainframe computers.

Referring now to FIG. 2, service processor 20 will be described. Service processor 20 is implemented on microcontroller chip 22, which contains central processing unit (CPU) 24, at least one timer 26, random access memory (RAM) 28, and erasable programmable read only memory (EPROM) 30. Microcontroller 22 also contains several I/O ports 32, which allow it to send and receive data from other devices in the system. Various internal buses (not shown) allow the elements of microcontroller 22 to communicate with each other.

Typically, EPROM 30 and RAM 28 are small. For example, a microcontroller may contain as little as 512 bytes of EPROM and 25 bytes of RAM. A program, such as a service processor program, is coded into EPROM 30. RAM 28 is used for stack and heap space, and also to hold any variables needed by the program executing in EPROM 30. Because the amount of RAM 28 is typically limited in a microcontroller, it is important that the program executing in EPROM 30 use as little RAM space as possible.

The present invention is a method, system, and computer readable medium for granting permission to modify a memory area, such as a data variable stored in RAM 28, without using valuable RAM space to store permission variables. Rather than using separate permission variables, a portion of a data variable is used to indicate whether or not the data variable may be modified. No permission variables are necessary, thus freeing up valuable RAM space, and allowing more functionality to be incorporated into microcontroller 22.

The present invention also increases the efficiency of service processor 20. First, because RAM space is conserved, more data may be stored in RAM 28, and thus more data functions may be implemented in microcontroller 22, rather than "off-chip" (i.e. another microcontroller or other hardwired logic). Second, because permission to modify a data variable is contained within the data variable itself, the program executing in EPROM 30 does not need to reference a permission, or locking, variable array and test for permission to modify a data variable.

One embodiment of the present invention is in a service processor, implemented on a microcontroller, in an I/O drawer (e.g., drawer 18 shown in FIG. 1). The service processor in the I/O drawer continuously monitors environmental conditions in the drawer. When an environmental condition falls outside of a certain predetermined range, a counter associated with that particular environmental condition is incremented. When the counter reaches a particular value, an error alert is generated.

Figure 3:
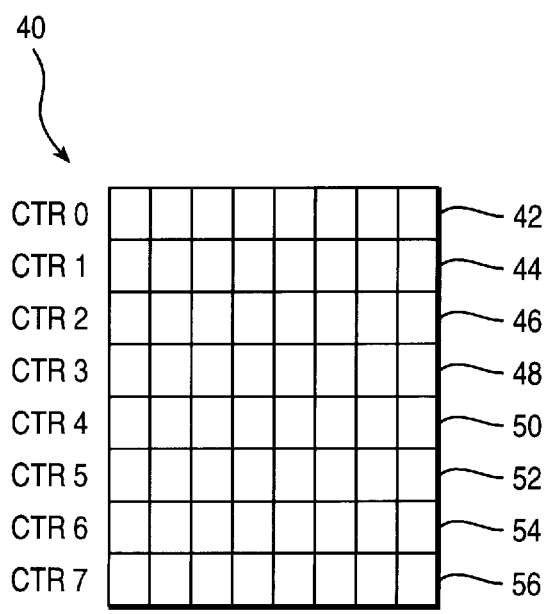
FIG. 3 is a block diagram of an array of counters.

FIG. 3 depicts an array of counters 40 associated with the fans in an I/O unit. Each counter is an eight-bit counter, and there is one counter for each fan. In the example shown in FIG. 3, there are eight fans, and thus there are eight counters, numbered from CTR0 42 to CTR7 56. The fan speeds are read on a regular basis by microcode in the I/O unit, and the data is sent to the microcontroller via a bus. In the described embodiment, it takes one second to read the fan speed of each fan, and thus eight seconds to read the eight fans. If a particular fan has a speed that is either too high or too low, the counter associated with that particular fan is incremented. If any fan counter reaches a certain maximum number, that particular fan is flagged as being out of specification. The main operating system is notified, via an interrupt, that there is a problem with the particular fan.

The fan counters should only be incremented after the fan speeds have been read. It is possible that the code which compares the actual fan speeds to the desired (i.e. specified) fan speeds may execute more frequently than the fans are read. For example, the fan speeds may be read every eight seconds, as discussed above, while the code which compares the actual fan speeds to the desired fan speeds may execute many times per second. Thus, it becomes important to know when the fan speeds have been newly read, and when it is permissible to increment (if necessary) the fan counters.

This is accomplished by using the least significant bit of each counter as a permission indicator. When the least significant bit is set to one, it is permissible to increment the counter. When the least significant bit is set to zero, it is not permissible to increment the counter. An exemplary code statement, shown in C, for using the least significant bit to indicate permission, is shown below. Note that a single C statement both determines if it is permissible to increment counter[i], and if so, increments counter[i]. counter[i]+= (counter[i] & 1)

If the least significant bit of the counter is equal to one, the counter will be incremented. However, if the least significant bit of the counter is zero, the counter will not be incremented. Suppose, for example, that counter[i] contains the value of ten. In binary, the eight bits of counter[i] are 00001010. Based on the above C statement, counter[i] will not be incremented. This is illustrated as follows:

counter[i]+=(counter[i] & 1)
00001010+=(00001010 & 000000001)
00001010+=0
00001010

However, suppose that counter[i] contains the value of 11. In binary, the eight bits of ccunter[i] are 00001011. Now, because the least significant bit of counter[i] is equal to one, it can be incremented by the above C statement. This is shown as follows:

counter[i]+=(counter[i] & 1)
00001011+=(00001011 & 00000001)
00001011+=1
00001100

Figure 4:
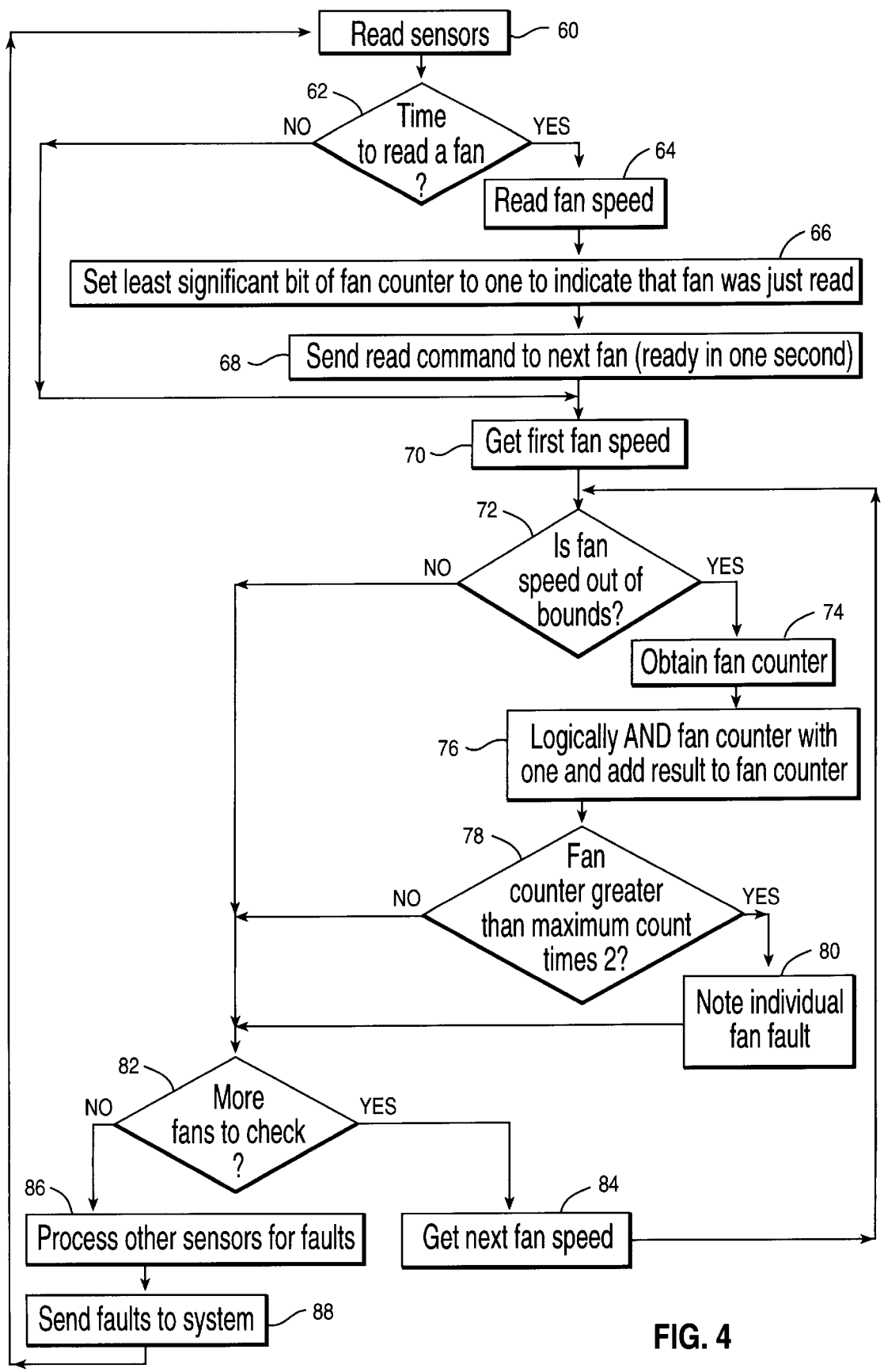
FIG. 4 is a flow chart depicting a method for granting permission to update a memory area, according to the teachings of the present invention.

FIG. 4 is a flow chart depicting a method for implementing the present invention. First, all sensors that are being monitored are read (step 60). Next, it is determined if it is time to read a fan speed (step 62). As discussed above, each fan is read once per second. Those skilled in the art will appreciate that there are many ways to determine if it is time to read a fan. For example, a timer (such as timer 26 in FIG. 2 may be used). If it is time to read a fan speed (i.e. the answer to the question in step 62 is "yes"), the fan speed of the fan is read (step 64). Typically fans are read in order, from 0 to 7, and those skilled in the art will appreciate that a counter or other such method may be used to keep track of which fan speed to read next. Once the fan speed has been read, the least significant bit of the corresponding fan counter is set to one (step 66). This may be accomplished by logically ORing the fan counter with one. When the least significant bit of a fan counter is equal to one, it indicates that the fan speed has been read, and it is therefore permissible to increment the fan counter if a fan speed is out of specification. A read command is then sent to the next fan to be read (step 68). Note that the next fan speed will be available in one second.

The fan speed of the first fan is then obtained (step 70) and checked to determine if it is out of the specified range (step 72). If so (i.e. the answer to the question in step 72 is "yes"), the fan counter associated with the fan is obtained (step 74). The fan counter is logically ANDed with one and the result is added to the fan counter (step 76). One possible method for implementing step 76 is the C statement discussed above. Of course, those skilled in the art will realize that many different programming statements from a variety of programming languages may be used. As discussed above, step 76 ensures that a fan counter is only incremented when its least significant bit is equal to one. After a fan counter has been incremented, its least significant bit will then be zero, and therefore, it will not be possible to increment the counter again until the least significant bit of the counter is set to one again in step 66.

Every time a fan speed is out of specification, its associated fan counter actually gets incremented by two. This is because the fan counter is incremented by one in step 66 when its least significant bit is set to one, and then (if the fan speed is out of bounds), the fan counter is incremented by one in step 76. This means that each fan counter contains a value which is actually double the number of times that its associated fan counter has been out of specification. The actual value of the fan counter (i.e. the number of times the fan speed has actually been out of specification) is half the value of the fan counter. Therefore, in step 78, the fan counter is compared to double the maximum count. If the fan counter is greater than the maximum count times two (i.e. the answer to the question in step 78 is "yes") the fan is noted as having an individual fan fault (step 80). Those skilled in the art will realize that the fan counter could be divided by two in step 78 and then compared to the maximum count.

Next, it is determined if there are more fans to check (step 82). If so, the next fan speed is obtained (step 84) and the process returns to step 72. If all fans, 0 through 7, have been checked (i.e. the answer to the question in step 82 is "no"), the other sensors (read in step 60) are processed for faults (step 86). Finally, all faults are sent to the system (step 88) and the process begins again at step 60.

The method described in FIG. 4 allows the fan speeds to be checked during every loop of the process. However, a particular fan counter will only be incremented if the fan associated with the fan counter has just been read. By using the method described in FIG. 4, it is possible to determine when a fan has been read, and thus when it is permissible to increment the fan counter, without implementing a separate permission variable for each fan. Thus, scarce RAM space is conserved.

Although the invention has been described with a certain degree of particularity, it should be recognized that elements thereof may be altered by persons skilled in the art without departing from the spirit and scope of the invention. One of the implementations of the invention is as sets of instructions resident in the random access memory of one or more computer systems configured generally as described in FIGS. 1 and 2. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art will appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for incrementing a variable in an information handling system, comprising the steps of:

setting a least significant bit of the variable to a permission indicator value;

logically ANDing the least significant bit of the variable with one to obtain a first result; and adding the first result to the variable;

whereby the variable is incremented if the permission indicator value is one.

2. A method according to claim 1, wherein said setting step comprises the steps of:

determining if it is permissible to increment the variable; and in response to said determining, setting the least significant bit equal to one to indicate that it is permissible to increment the variable.

3. A method according to claim 2, further comprising the step of initializing the least significant bit to zero.

4. A method according to claim 1, further comprising the step of determining an actual value of the variable, wherein said determining includes the step of dividing the variable by two.

5. An information handling system, comprising:

a processor;

a memory means;

a program executing in said processor;

one or more variables, used by said program, and stored in said memory means;

means for setting a least significant bit of a selected variable to a permission indicator value;

means for logically ANDing the least significant bit of the selected variable with one to obtain a first result; and means for adding the first result to the selected variable;

whereby the selected variable is incremented if the permission indicator value is one.

6. An information handling system according to claim 5, wherein said means for setting comprises:

means for determining if it is permissible to increment the selected variable; and means for setting the least significant bit equal to one to indicate that it is permissible to increment the selected variable.

7. An information handling system according to claim 6, further comprising means for initializing the least significant bit to zero.

8. An information handling system according to claim 5, further comprising means for determining an actual value of the selected variable, wherein said means for determining includes means for dividing the selected variable by two.

9. A computer readable medium for controlling incrementing of a variable in an information handling system, comprising:

means for setting a least significant bit of the variable to a permission indicator value;

means for logically ANDing the least significant bit of the variable with one to obtain a first result; and means for adding the first result to the variable;

whereby the variable is incremented if the permission indicator value is one.

10. A computer readable medium according to claim 9, wherein said means for setting comprises:
   means for determining if it is permissible to increment the variable; and
   means for setting the least significant bit equal to one to indicate that it is permissible to increment the variable.

11. A computer readable medium according to claim 10, further comprising means for initializing the least significant bit to zero.

12. A computer readable medium according to claim 9, further comprising means for determining an actual value of the variable, wherein said means for determining includes means for dividing the variable by two.

* * * * *